United States Patent [19]
Taplin

[11] 3,886,915
[45] June 3, 1975

[54] PASSIVE ADAPTIVE ENGINE CONTROL SYSTEM FOR IMPROVED VEHICLE DRIVEABILITY

[75] Inventor: Lael B. Taplin, Livonia, Mich.

[73] Assignee: The Bendix Corporation, Teterboro, N.J.

[22] Filed: Sept. 28, 1973

[21] Appl. No.: 401,760

[52] U.S. Cl. .............................. 123/102; 180/105 E
[51] Int. Cl. ...................... F02d 11/10; B60k 31/00
[58] Field of Search ............ 123/102, 103; 180/107, 180/105 E

[56] References Cited
UNITED STATES PATENTS

| | | | |
|---|---|---|---|
| 2,842,108 | 7/1958 | Sanders | 123/102 |
| 2,960,629 | 11/1960 | Oldenburger | 123/102 X |
| 3,502,167 | 3/1970 | Baxter et al. | 180/107 |
| 3,533,236 | 10/1970 | Cottington | 123/102 X |
| 3,580,355 | 5/1971 | Osaka et al. | 180/105 E |
| 3,648,808 | 3/1972 | Kato | 123/102 X |
| 3,731,664 | 5/1973 | Tsuzuki | 123/102 |
| 3,739,757 | 6/1973 | Ohtani et al. | 123/102 |
| 3,750,632 | 8/1973 | Zechnall | 123/117 R X |
| 3,752,252 | 8/1973 | Sakakibara | 123/102 X |
| 3,777,174 | 12/1973 | Butscher et al. | 123/102 X |
| 3,820,624 | 6/1974 | Sakikibara | 180/105 E |

Primary Examiner—Charles J. Myhre
Assistant Examiner—Tony Argenbright
Attorney, Agent, or Firm—Anthony F. Cuoco; S. H. Hartz

[57] ABSTRACT

A passive adaptive engine control system for a vehicle includes a control loop for providing a transient control to the engine which improves vehicle driveability under a wide range of driving conditions. A model provides an output in accordance with a desired vehicle response and the transient control is provided so that the actual vehicle response is adapted to that of the model.

8 Claims, 4 Drawing Figures

PASSIVE ADAPTIVE ENGINE CONTROL SYSTEM FOR IMPROVED VEHICLE DRIVEABILITY

BACKGROUND OF THE INVENTION

1. Field of the Invention

This invention relates generally to vehicle engines and particularly to systems for controlling said engines to improve the driveability of the vehicle. More particularly, this invention relates to engine control systems whereby a transient control is applied for adapting the actual response of the vehicle to a desired response for improving vehicle driveability.

2. Description of the Prior Art

Prior art vehicle engine control systems have been designed for controlling the steady state speed of the vehicle to some predetermined "set" speed. This has been accomplished through a servo controlled throttle, whereby the throttle setting is adjusted when a vehicle speed error occurs. In these systems the servo takes over control of the throttle as if the vehicle operator were doing the same through the accelerator. However, the prior art systems have not had the purpose of affecting the dynamic response of the vehicle for improving vehicle driveability under a wide range of driving conditions. This latter consideration is becoming more and more important as engines are adapted to meet stringent emission standards. The present invention accommodates this situation by permitting the operator to retain control of the vehicle, and when speed changes are requested by the vehicle operator through the accelerator the passive adaptive control system of the invention adds transient controls in accordance with a desired vehicle response in order to improve vehicle driveability during the speed changes.

SUMMARY OF THE INVENTION

This invention contemplates a passive adaptive control system including means for providing a signal in accordance with actual vehicle response. A signal corresponding to operator-effected accelerator displacement is applied to a model which provides a signal corresponding to a desired vehicle response. In one embodiment of the invention the desired response and actual response signals are combined and the combined signal drives a servo system. Servo motor shaft displacement and accelerator displacement are combined and the combined displacement actuates the engine throttle valve to apply a transient control to the engine so that the response of the vehicle follows that of the model.

In another embodiment of the invention the accelerator displacement signal and the combined signal are combined and the latter combined signal drives the servo system to actuate the engine throttle valve.

Use of the invention is contemplated with an engine of the type having two throttle valves. One of the valves is actuated by the accelerator via the operator and the other is actuated by the servo motor in response to the combined desired and actual response signals to apply the transient control.

The invention may also be used with an engine of the type featuring electronic fuel control wherein a signal is generated for delivering metered fuel flow to the engine. In this embodiment of the invention the combined actual and desired response signal is summed with the fuel flow delivery signal to add or subtract fuel flow as required for providing transient engine controls.

One object of this invention is to provide a passive adaptive vehicle engine control system for improving the driveability of the vehicle under a wide range of driving conditions.

Another object of this invention is to accomplish the above while meeting increasingly stringent engine emission standards and without foregoing operator control.

Another object of this invention is to accomplish the above by providing a control loop which generates a signal corresponding to the difference between a desired engine response and the actual engine response and to employ the signal to apply a transient control to the engine.

Another object of this invention is to use the difference signal to drive a servo system and to operate the engine throttle valve as a function of the combined servo motor shaft and accelerator displacements to apply the transient control to the engine.

Another object of this invention is to operate the throttle valve through the servo in response to the difference signal and a signal corresponding to accelerator displacement.

Another object of this invention is to use the passive adaptive control system in conjunction with an engine of the type having a pair of throttle valves. One of the valves is operated by the accelerator via the operator and the other is operated by the servo motor in response to the difference signal to apply the transient control to the engine.

Another object of this invention is to use the difference signal in conjunction with a fuel injection delivery signal. The fuel injection delivery signal and the difference signal are combined and fuel flow to the engine is controlled in response to the combined signal to apply the transient control to the engine.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

DESCRIPTION OF THE INVENTION

Figure 1:
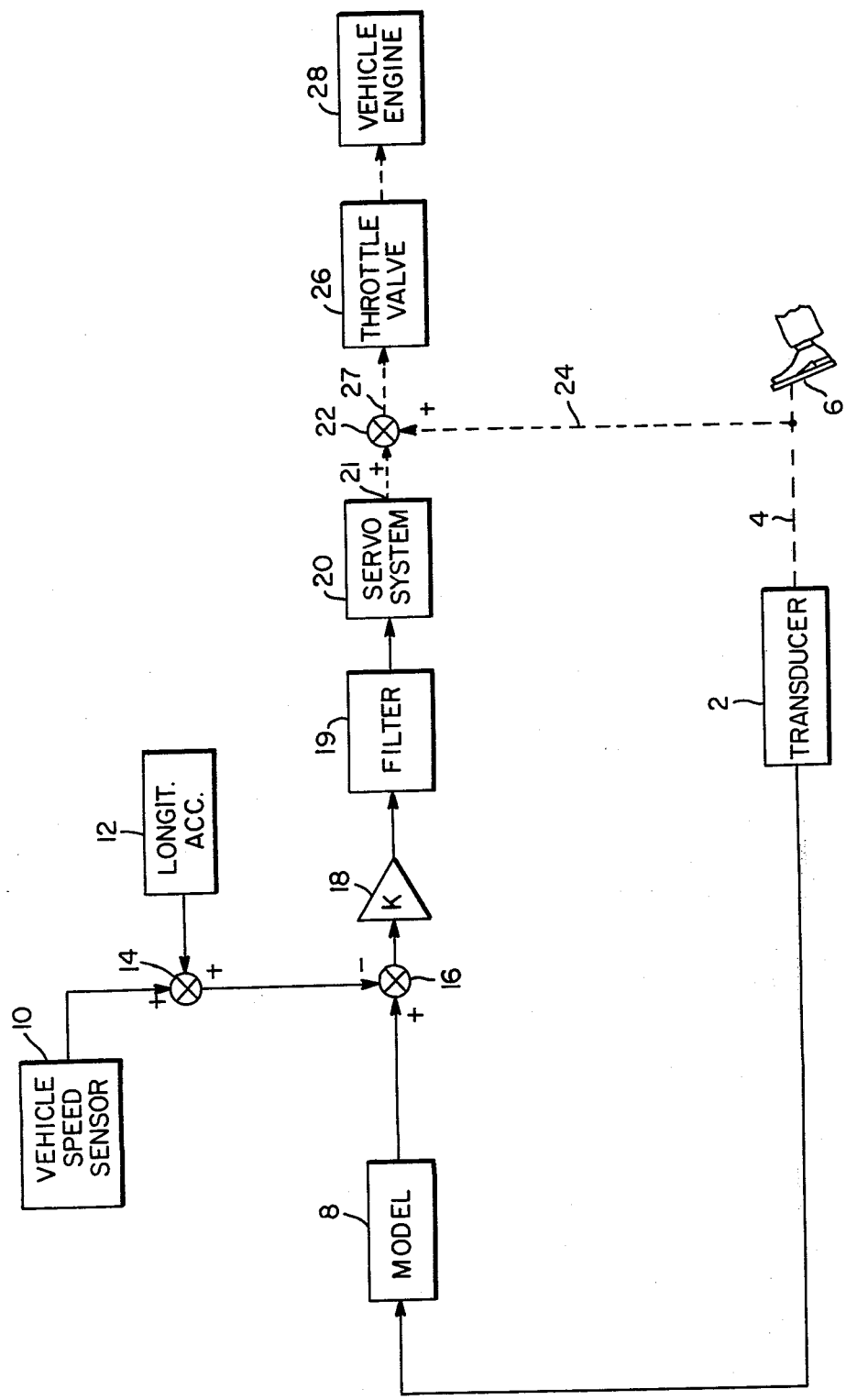
FIG. 1 is a block diagram showing one embodiment of the invention whereby the vehicle throttle linkage is operated by a servo system as a function of actual and desired vehicle response and accelerator displacement.

With reference first to FIG. 1, a servo system 20 is arranged with vehicle throttle linkage 24 to provide a transient opening of a throttle valve 26 in addition to that effected by an accelerator 6 so that the vehicle response is adapted to that of a model 8. To this end, a transducer 2 is connected through suitable mechanical means 4 to accelerator 6 which is actuated by the operator of the vehicle for acceleration or deceleration as the case may be. Transducer 2 provides a signal corresponding to the accelerator displacement. For this purpose transducer 2 may be a potentiometer, a differential transformer or like means for converting a mechanical displacement into an electrical signal as is well known in the art.

The signal from transducer 2 is applied to model 8. Model 8 may include a simple first order filter network and provides a signal corresponding to the desired dynamic response of the vehicle; that is, a signal corresponding to the desired speed of the vehicle as a function of accelerator displacement.

A speed sensor 10 provides a signal corresponding to the speed of the vehicle. Speed sensor 10 may be of the conventional type comprised of a speed pickup, a frequency to voltage converter and a filter. The speed pickup senses the speed of the vehicle and provides an output signal having a frequency which is proportional to the sensed speed. The output signal is converted to a voltage level which is a function of the frequency of the signal from the speed pickup.

A longitudinal accelerometer 12 suitably mounted in the vehicle provides a signal corresponding to the longitudinal acceleration of the vehicle. The speed signal from sensor 10 and the acceleration signal from sensor 12 are applied to a suitable signal summing means 14 and summed thereby to provide a signal corresponding to the actual response of the vehicle. The signal from summing means 14 and the signal from model 8 are applied to a suitable summing means 16 and summed thereby to provide a signal corresponding to the difference between the desired and actual vehicle responses. Summing means 14 and 16 may be conventional operational summing amplifiers.

The difference signal from summing means 16 is applied to an amplifier 18 having a gain K and the gain adjusted signal from amplifier 18 is applied to a filter 19 which applies a dynamic adjustment to the gain adjusted signal to insure overall system stability. The filtered signal is applied to a servo system 20 which may be of the conventional type including a servo amplifier, a servo motor and suitable feedback means, whereby the servo motor shaft displacement corresponds to the difference signal from summing means 16. The servo motor shaft displacement is applied to a suitable mechanical summing linkage 22 through suitable linkage 21 and summed thereby with the displacement of accelerator 6 applied to summing means 22 through throttle actuator 24. Although the gain of amplifier 18 is shown as being constant it is to be understood that this gain may be made variable as a function of vehicle speed or the difference signal to enhance system performance.

The summed displacement from summing means 22 is applied to throttle valve 26 through a suitable linkage 27 for controlling the throttle valve in accordance with a vehicle speed change as commanded by the operator of the vehicle through accelerator 6 to change the air flow to an engine 28 as will now be understood. The control thus provided by accelerator 6 is augmented by a transient control provided by the control loop including transducer 2, model 8 and servo system 20 so that the dynamic response of the vehicle is adapted to that of model 8. In other words, with servo system 20 arranged with throttle linkage 24 as shown, additional throttle valve position changes may be added or subtracted from the operator commanded throttle position to improve the driveability of the vehicle.

Figure 4:
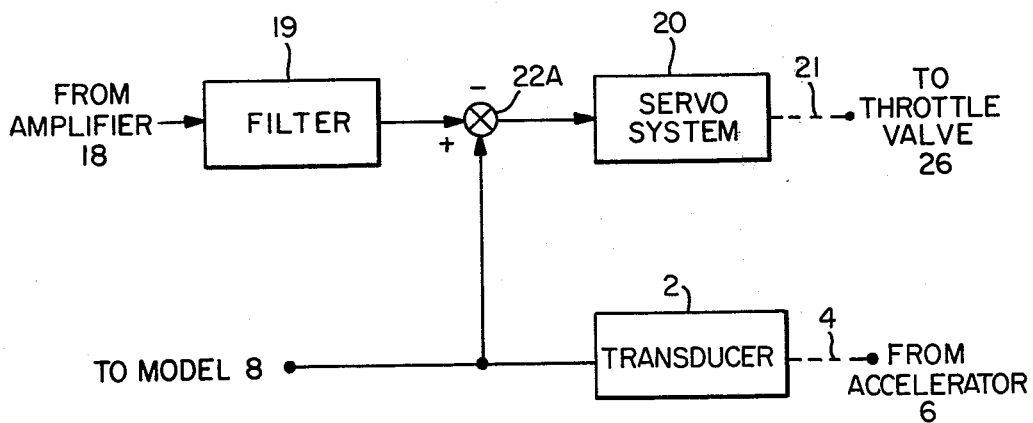
FIG. 4 is a block diagram of yet another embodiment of the invention wherein the servo system operates the throttle linkage as a function of actual and desired response signals and an acceleration displacement signal.

Servo system may be arranged to directly drive throttle valve 26 as shown in FIG. 4. Thus, the accelerator displacement signal from transducer 2 is applied to a summing means 22A and summed thereby with the signal from filter 19 generated as described with reference to FIG. 1. The error signal so provided by summing means 22A drives servo system 20. The servo motor shaft is coupled through means 21 to throttle valve 26 for actuating the throttle valve as heretofore noted.

Figure 2:
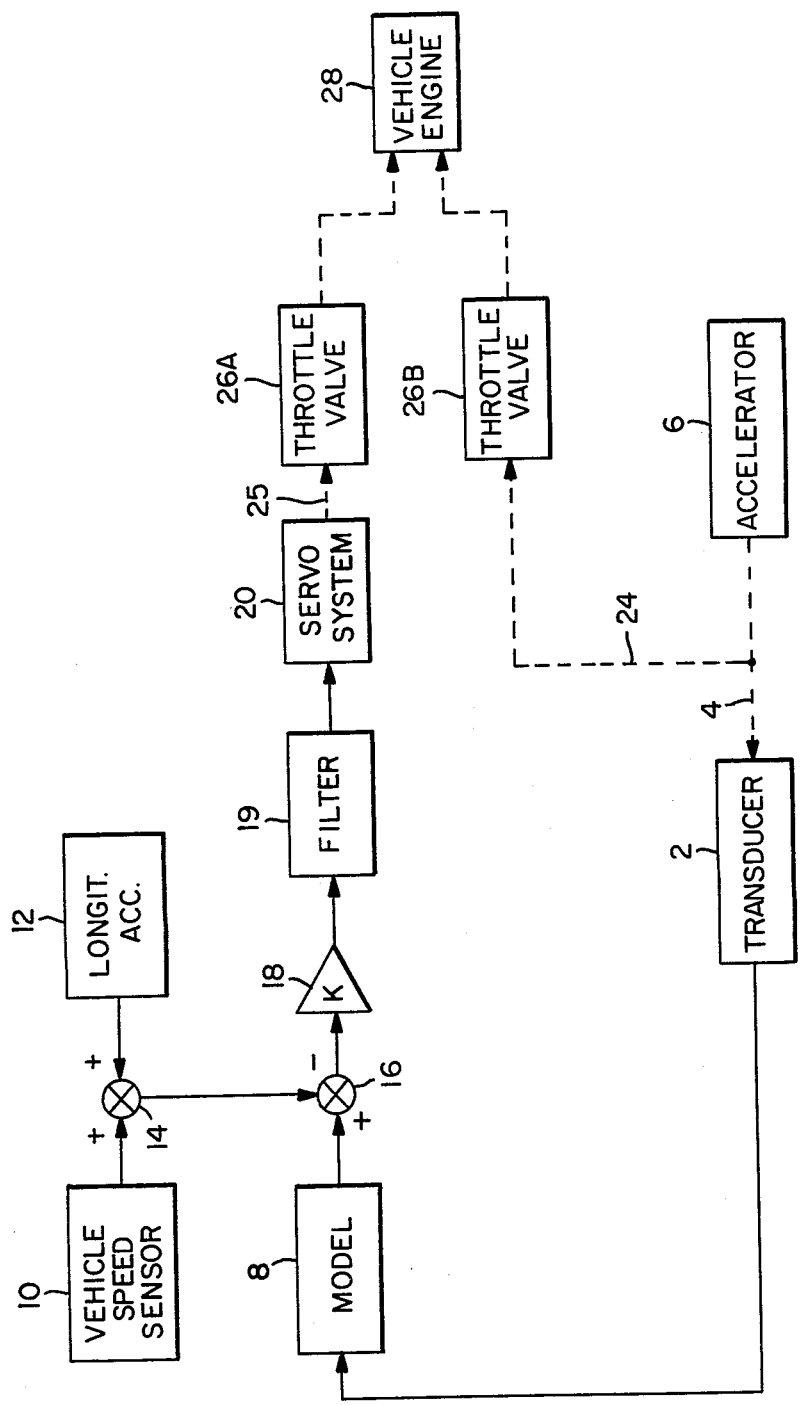
FIG. 2 is a block diagram of another embodiment of the invention whereby a second throttle valve is controlled by the servo system so that the vehicle response follows a desired response.

The embodiment of the invention shown in FIGS. 1 and 4 illustrates the use of the invention with an engine of the type having a single throttle valve. The system is adaptable as well to an engine of the type having two throttle valves 26A and 26B as shown in FIG. 2. In this event, accelerator 6 is connected through throttle linkage 24 to throttle valve 26B. Servo system 20 is connected through suitable mechanical linkage 25 to throttle valve 26A. Throttle valve 26B is conventionally operator-operated through accelerator 9, while throttle valve 26A is controlled by servo system 20 to add or subtract air flow to vehicle engine 28 so that the response of the vehicle follows the response of model 8 as will now be understood from the description of the invention with reference to FIG. 1.

Figure 3:
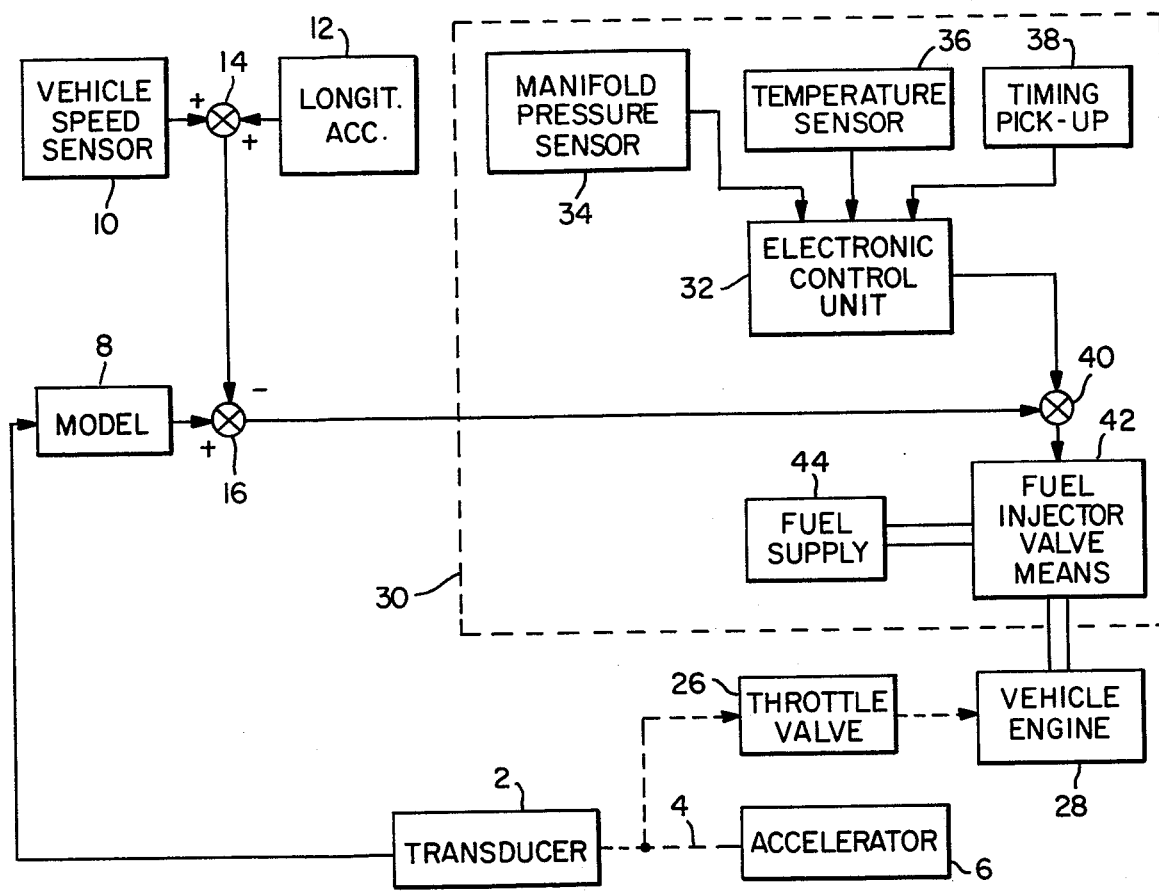
FIG. 3 is a block diagram of still another embodiment of the invention wherein a signal is provided for controlling the amount of fuel to an engine, and which signal is combined with a signal in accordance with the difference between the desired and actual response of the vehicle to control the amount of the fuel to the engine so that the actual response follows the desired response.

The device of the invention is adaptable to a variety of engine systems. For purposes of illustration, the embodiment of the invention illustrated in FIG. 3 shows the passive adaptive control system described as used in conjunction with an electronic fuel injection (EFI) system designated by the numeral 30. EFI system 30 is of the type including an electronic control unit 32 which generates a fuel injection signal in response to engine parameter signals such as, for purposes of illustration, a signal corresponding to engine manifold pressure from a manifold pressure sensor 34, a signal corresponding to engine temperature from a temperature sensor 36 and engine timing signals from a timing pickup 38. The signal from electronic control unit 32 is applied to a suitable electrical summing means 40, which may be an operational summing amplifier, and summed thereby with the signal from electrical summing means 16 to provide a signal for operating a fuel injector valve means 42 which injects fuel into engine 28 from a fuel fupply 44 as is well known in the electronic fuel injection art. Throttle valve 26 is operated through accelerator 6 as heretofore described. In this event the signal from summing means 16 is used to add or subtract fuel flow as required so that the dynamic response of the vehicle follows the response of model 8.

It will now be seen from the aforegoing description that the passive adaptive engine control system according to the invention tends to eliminate driveability problems which may appear and which may be particularly prevalent with the installation of emission control equipment in the engine. Thus, if a "stumble" or "hesitation" is experienced upon an accelerator requested speed change, the passive adaptive system of the invention will tend to eliminate this condition. Likewise, if the vehicle is climbing a grade the system will insure that the vehicle has the same response upon a requested speed change as if the vehicle were on a level road.

For purposes of illustration the system of the invention has been described with reference to vehicle speed and acceleration being the sensed parameters for deriving the actual response of the vehicle. In addition to these parameters, anticipatory signals derived from the engine such as manifold pressure and the like may be used as well. The selection of the sensed variable will then determine the type of model to be used for establishing the desired response of the vehicle. With this flexibility a number of possibilities exist for further improving vehicle driveability, with the limitation of these possibilities being only the complexity of the model and the resulting cost of the system. Through the use of a passive adaptive system as herein described complex gain adjustment and off-line computers are not needed so that low cost adaptive vehicle control is provided.

In order to further enchance the workability of the system redundancy features may be added. To this end the systems shown in FIGS. 1-4 may include an appropriate duplication of equipment to provide the degree of reliability desired.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. In a vehicle engine of the type whereby the engine is operator controlled through an accelerator, the improvement comrpising:
    means connected to the accelerator and responsive to the operator controlled displacement thereof for providing a signal corresponding to a desired response of the vehicle, including a transducer connected to the accelerator for providing a signal corresponding to the displacement thereof and a model connected to the transducer and responsive to the signal therefrom for providing the desired vehicle response signal;
    means for providing a signal corresponding to the actual response of the vehicle;
    means for combining the desired and actual response signals and for providing a signal corresponding to the difference therebetween; and
    means connected to the difference signal means, the accelerator and the engine for controlling the engine in response to the difference signal and the accelerator displacement.

2. The improvement as described by claim 1, wherein the means connected to the difference signal means, the accelerator and the engine for controlling the engine in response to the difference signal and the accelerator displacement includes:
    a servo system connected to the difference signal means and providing a servo motor shaft displacement in response to the difference signal;
    means for combining the servo motor shaft displacement and the accelerator displacement; and
    throttle valve means connected to the combining means for controlling the engine in response to the combined displacement.

3. The improvement as described by claim 1, wherein the means connected to the difference signal means, the accelerator and the engine for controlling the engine in response to the difference signal and the accelerator displacement signal includes:
    a servo system connected to the difference signal means and providing a servo motor shaft displacement in response to the difference signal;
    a first throttle valve connected to the servo system and to the engine for controlling the engine in response to the servo motor displacement; and
    a second throttle valve connected to the accelerator and to the engine for controlling the engine in response to the accelerator displacement.

4. The improvement as described by claim 1, wherein the means connected to the difference signal means, the accelerator and the engine for controlling the engine in response to the difference signal and the accelerator displacement includes:
    a transducer connected to the accelerator for providing a signal corresponding to the displacement thereof;
    a servo system connected to the difference signal means and to the transducer for providing a servo motor shaft displacement in response to the signals therefrom; and
    throttle valve means connected to the servo system for controlling the engine in response to said displacement.

5. The improvement as described by claim 1, wherein the means connected to the difference signal means, the accelerator and the engine for controlling the engine in response to the difference signal and the accelerator displacement includes:
    fuel injection means connected to the difference signal means and controlled by the signal therefrom for injecting fuel into the engine; and
    throttle valve means connected to the accelerator and responsive to the accelerator displacement for controlling the flow of air to the engine.

6. The improvement as described by claim 1, wherein:
    the means for providing a signal corresponding to the actual response of the vehicle includes;
    means for sensing the speed of the vehicle and for providing a corresponding signal;
    means for sensing the acceleration of the vehicle and for providing a corresponding signal; and
    means for combining said signals for providing the actual response signal.

7. The improvement as described by claim 1, including:
    means for adjusting the gain of the difference signal;
    means for filtering the gain adjusted signal to insure overall system stability; and
    the means connected to the difference signal means, the accelerator and the engine for controlling the engine in response to the difference signal and the accelerator displacement being connected to the filter, the accelerator and the engine for controlling the engine in response to the filtered signal and the accelerator displacement.

8. The improvement as described by claim 1, wherein the means connected to the difference signal means, the accelerator and the engine for controlling the engine in response to the difference signal and the accelerator displacement includes:
  a servo system connected to the difference signal means and to the transducer for providing a servo motor shaft displacement in response to the signals therefrom; and
  throttle valve means connected to the servo means for controlling the engine in response to said displacement.

* * * * *